United States Patent
Kellomäki et al.

(10) Patent No.: US 9,303,977 B2
(45) Date of Patent: Apr. 5, 2016

(54) APPARATUS AND METHOD FOR MEASURING CALIPER OF CREPED TISSUE PAPER BASED ON A DOMINANT FREQUENCY OF THE PAPER AND A STANDARD DEVIATION OF DIFFUSELY REFLECTED LIGHT INCLUDING IDENTIFYING A CALIPER MEASUREMENT BY USING THE IMAGE OF THE PAPER

(71) Applicant: Honeywell International Inc., Morristown, NJ (US)

(72) Inventors: Markku Kellomäki, Kuopio (FI); Antti Paavola, Tampere (FI)

(73) Assignee: Honeywell International Inc., Morris Plains, NJ (US)

( * ) Notice: Subject to any disclaimer, the term of this patent is extended or adjusted under 35 U.S.C. 154(b) by 187 days.

(21) Appl. No.: 14/222,251

(22) Filed: Mar. 21, 2014

(65) Prior Publication Data
US 2015/0108375 A1 Apr. 23, 2015

Related U.S. Application Data

(60) Provisional application No. 61/892,235, filed on Oct. 17, 2013.

(51) Int. Cl.
G01B 11/06 (2006.01)
G01B 11/30 (2006.01)

(52) U.S. Cl.
CPC .............. *G01B 11/06* (2013.01); *G01B 11/303* (2013.01)

(58) Field of Classification Search
CPC .... G01B 11/06; G01B 11/02; G01B 11/0625; G01B 11/24

USPC ......... 250/221, 559.4, 559.27, 208.1; 356/71, 356/430; 271/265.04; 382/141, 145, 149, 382/151; 162/109, 111, 113
See application file for complete search history.

(56) References Cited

U.S. PATENT DOCUMENTS

| 4,878,114 A | 10/1989 | Huynh et al. |
| 5,374,334 A | 12/1994 | Sommese et al. |

(Continued)

FOREIGN PATENT DOCUMENTS

| CA | 2 844 414 A1 | 5/2013 |
| WO | WO 93/06300 A1 | 4/1993 |

(Continued)

OTHER PUBLICATIONS

Sylvia Drabycz, et al., "Image Texture Characterization Using the Discrete Orthonormal S-Transform", Journal of Digital Imaging, vol. 22, No. 6, Dec. 2009, p. 696-708.

(Continued)

*Primary Examiner* — Que T Le

(57) ABSTRACT

A method includes, using at least one processing device, obtaining an image of a web of creped tissue paper and identifying a caliper measurement of the web using the image. The caliper measurement is based on a dominant frequency of the web and a standard deviation of diffusely-reflected light from the web. The dominant frequency of the web can be based on a number of crepe folds having a dominant crepe fold size that fit within a specified unit distance of the web in the image. The dominant crepe fold size can be determined using a discrete auto-covariance function of the image or a second image of the web. The standard deviation can be based on a variation of reflected light from larger crepe structures in the web.

20 Claims, 10 Drawing Sheets

(56) References Cited

U.S. PATENT DOCUMENTS

| | | | |
|---|---|---|---|
| 5,513,275 | A | 4/1996 | Khalaj et al. |
| 5,654,799 | A | 8/1997 | Chase et al. |
| 5,865,950 | A | 2/1999 | Vinson et al. |
| 6,425,983 | B1 | 7/2002 | Marinack et al. |
| 7,545,971 | B2 | 6/2009 | Shakespeare |
| 8,840,775 | B2 | 9/2014 | Chen et al. |
| 8,958,898 | B2 * | 2/2015 | Von Drasek ....... G01B 11/0608 162/100 |
| 2002/0034338 | A1 | 3/2002 | Askary |
| 2004/0264795 | A1 | 12/2004 | Fielding |
| 2007/0133878 | A1 | 6/2007 | Porikli et al. |
| 2008/0013818 | A1 | 1/2008 | Shakespeare |
| 2008/0019611 | A1 | 1/2008 | Larkin et al. |
| 2008/0205518 | A1 | 8/2008 | Wilinski et al. |
| 2011/0007940 | A1 | 1/2011 | Hamza et al. |
| 2011/0284178 | A1 | 11/2011 | Shakespeare |
| 2013/0116812 | A1 | 5/2013 | Drasek et al. |

FOREIGN PATENT DOCUMENTS

| | | |
|---|---|---|
| WO | WO 95/16072 A1 | 6/1995 |
| WO | WO 2013/029546 A1 | 3/2013 |
| WO | WO 2014/087046 A1 | 6/2014 |

OTHER PUBLICATIONS

Markku Kellomaki, "Apparatus and Method for Characterizing Texture", U.S. Appl. No. 14/173,284, filed Feb. 5, 2014.

Antti Paavola, et al., "Apparatus and Method for Closed-Loop Control of Creped Tissue Paper Structure", U.S. Appl. No. 14/225,703, filed Mar. 26, 2014.

Jukka-Pekka Raunio et al., "Simulation of creping pattern in tissue paper", Nordic Pulp and Ppaer Research Journal, vol. 27, No. 2, 2012, p. 375-381.

J. J. Pawlak, et al., "Image Analysis Technique for the Characterization of Tissue Softness", p. 231-238. (No date).

Jukka-Pekka Raunio, et al., "Variability of Crepe Frequency in Tissue Paper; Relationship to Basis Weight", Control Systems 2012, p. 23-41.

Petr Jordan, "Image-Based Mechanical Characterization of Soft Tissue using Three Dimensional Ultrasound", Aug. 2008, 137 pages.

Soon-Il An, "Conditional Maximum Covariance Analysis and Its Application to the Tropical Indian Ocean SST and Surface Wind Stress Anomalies", Journal of Climate, vol. 16, Jun. 27, 2002 and Mar. 12, 2003, p. 2932-2938.

"Section 6: Principal Component and Maximum Covariance Analyses, Maximum Covariance Analysis (MCA)", Analysis of Climate and Weather Data, 2014, p. 69-103.

Christoph H. Lampert, et al., "Weakly-Paired Maximum Covariance Analysis for Multimodal Dimensionality Reduction and Transfer Learning", ECCV 2010, Part II, LNCS 6312, 2010, p. 566-579.

John Krumm, et al., "Local Spatial Frequency Analysis of Image Texture", 3rd International Conference on Computer Vision, Dec. 4-7, 1990, p. 354-358.

Qi Tian, et al., "Algorithms for Subpixel Registration", Computer Vision, Graphics, and Image Processing, vol. 35, No. 2, Aug. 1, 1986, p. 220-233.

* cited by examiner

APPARATUS AND METHOD FOR MEASURING CALIPER OF CREPED TISSUE PAPER BASED ON A DOMINANT FREQUENCY OF THE PAPER AND A STANDARD DEVIATION OF DIFFUSELY REFLECTED LIGHT INCLUDING IDENTIFYING A CALIPER MEASUREMENT BY USING THE IMAGE OF THE PAPER

CROSS-REFERENCE TO RELATED APPLICATION AND PRIORITY CLAIM

This application claims priority under 35 U.S.C. §119(e) to U.S. Provisional Patent Application No. 61/892,235 filed on Oct. 17, 2013. This provisional patent application is hereby incorporated by reference in its entirety into this disclosure.

TECHNICAL FIELD

This disclosure relates generally to measurement systems. More specifically, this disclosure relates to an apparatus and method for measuring the caliper of creped tissue paper.

BACKGROUND

Various manufacturers operate systems that produce crepe paper. Crepe paper is tissue paper that has been "creped" or crinkled. Crepe paper can have various properties that are important to downstream processes and end users, such as caliper (thickness).

One standard approach for measuring the caliper of crepe paper is to take one or more small samples of crepe paper after the crepe paper has been manufactured. Each sample could, for example, be a circular sample of about 10 cm² in area. A known pressure is applied to the sample(s) for a specified amount of time, and the thickness of the sample(s) is measured, such as with an automatically-operated micrometer.

SUMMARY

This disclosure provides an apparatus and method for measuring the caliper of creped tissue paper.

In a first embodiment, a method includes, using at least one processing device, obtaining an image of a web of creped tissue paper and identifying a caliper measurement of the web using the image. The caliper measurement is based on a dominant frequency of the web and a standard deviation of diffusely-reflected light from the web.

In a second embodiment, an apparatus includes at least one memory configured to store an image of a web of creped tissue paper. The apparatus also includes at least one processing device configured to identify a caliper measurement of the web using the image based on a dominant frequency of the web and a standard deviation of diffusely-reflected light from the web.

In a third embodiment, a non-transitory computer readable medium embodies a computer program. The computer program includes computer readable program code for obtaining an image of a web of creped tissue paper. The computer program also includes computer readable program code for identifying a caliper measurement of the web using the image based on a dominant frequency of the web and a standard deviation of diffusely-reflected light from the web.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 9B, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
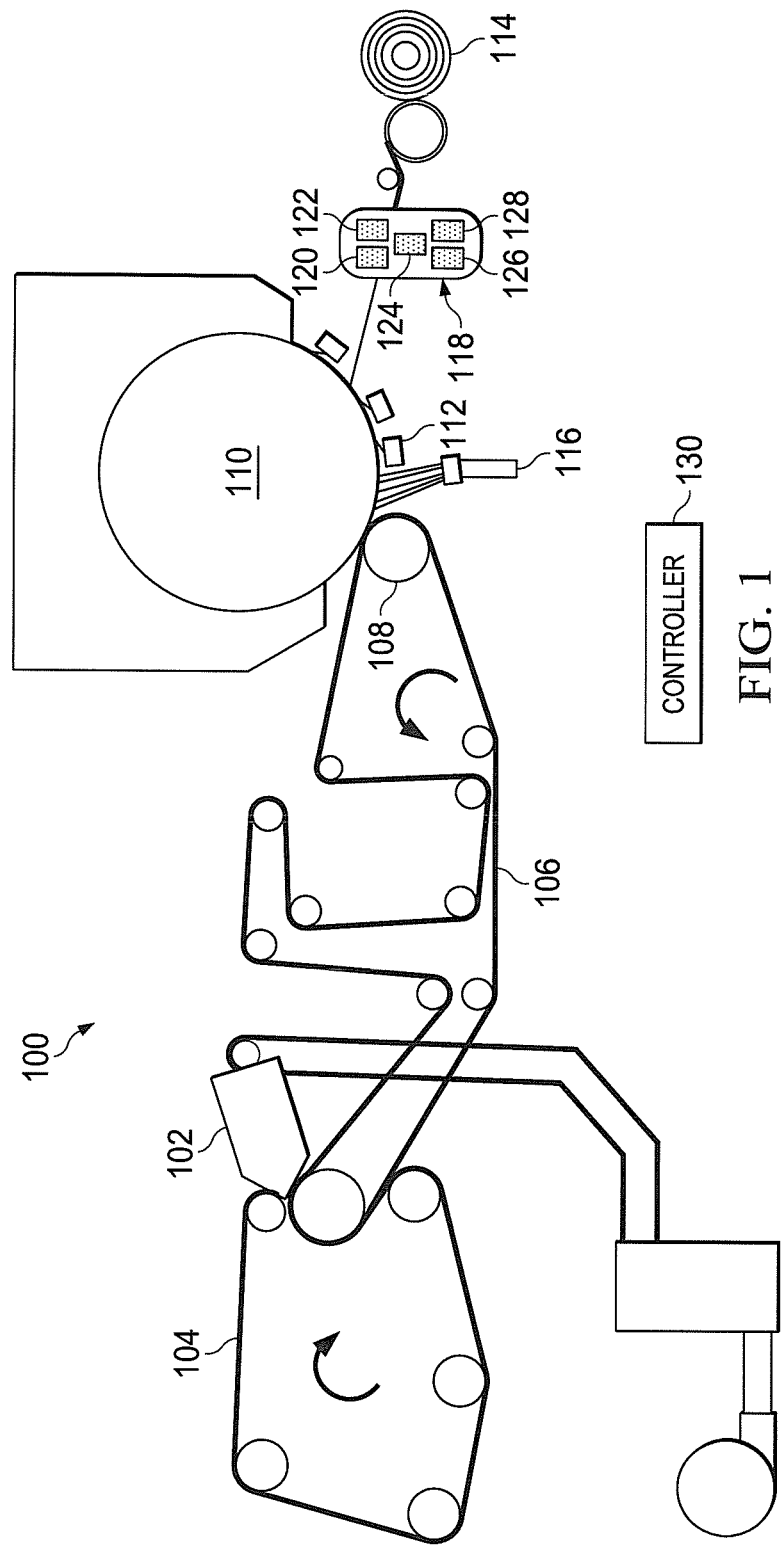
FIG. 1 illustrates an example system that uses a sensor for measuring the caliper of creped tissue paper according to this disclosure.

FIG. 1 illustrates an example system 100 that uses a sensor for measuring the caliper of creped tissue paper according to this disclosure. As shown in FIG. 1, the system 100 is used to manufacture creped tissue paper. An aqueous slurry of paper fibers is provided to a headbox 102. The headbox 102 deposits the slurry onto a substrate 104, such as a wire mesh. The substrate 104 allows water from the slurry to drain away and leave a wet web of paper fibers on the substrate 104. The substrate 104 is moved along its length in a continuous loop by multiple rollers.

The wet web of paper fibers is transferred to a press felt 106. The press felt 106 is also moved along its length in a continuous loop by multiple rollers. The press felt 106 carries the wet web of paper fibers to a pressure roll 108. The pressure roll 108 transfers the wet web of paper fibers to the surface of a Yankee dryer 110 (also called a creping cylinder). The Yankee dryer 110 dries the web of paper fibers as the Yankee dryer 110 rotates.

The dried web of paper fibers is removed from the surface of the Yankee dryer 110 by the application of a creping doctor 112. The creping doctor 112 includes a blade that forms crepe structures in the web of paper fibers. The resulting creped web of paper fibers is collected on a reel or drum 114 as creped tissue paper.

A spray boom 116 sprays material, such as a sizing agent, onto the Yankee dryer 110 before the wet web of paper fibers contacts the Yankee dryer 110. The sizing agent helps to hold the wet web of paper fibers against the Yankee dryer 110. The amount of creping produced by the creping doctor 112 depends in part on the amount of sizing agent applied to the Yankee dryer 110 by the spray boom 116.

The tissue paper industry lacks on-line (non-laboratory) methods and devices for measuring and controlling various characteristics of its products. One example of this is the lack of on-line caliper measurements of creped tissue paper. Caliper affects various end-user properties of creped tissue paper, such as its softness.

In accordance with this disclosure, a scanner 118 includes one or more sensors that measure at least one characteristic of manufactured creped tissue paper. For example, the scanner 118 includes one or more sensors for measuring the caliper of creped tissue paper. In some embodiments, the caliper measurements by the scanner 118 are based on (i) the dominant crepe fold size of the creped tissue paper and (ii) the standard deviation of the intensity of reflected light from the creped tissue paper. Any additional characteristic(s) of the creped tissue paper could also be measured. Each sensor in the scanner 118 could be stationary or move across part or all of the width of the manufactured creped tissue paper. The scanner 118 can use the techniques described below to measure the caliper of the creped tissue paper.

The scanner 118 includes any suitable structure(s) for measuring at least the caliper of creped tissue paper. For example, the scanner 118 could include at least one illumination source 120 for illuminating the creped tissue paper, such as with collimated light at an oblique angle. The scanner 118 could also include a digital camera or other imaging device 122 that captures digital images of the creped tissue paper. The scanner 118 could further include at least one processing device 124 that analyzes images from the imaging device 122 to measure the caliper of the creped tissue paper. In addition, the scanner 118 could include at least one memory 126 storing instructions and data used, generated, or collected by the scanner 118 and at least one interface 128 facilitating communication with other devices, such as a process controller.

Each illumination source 120 includes any suitable structure for generating illumination for creped tissue paper, such as one or more light emitting diodes (LEDs), pulsed laser diodes, laser diode arrays, or other light source(s). Each imaging device 122 includes any suitable structure for capturing digital images of creped tissue paper, such as a CMOS, CCD, or other digital camera. Each processing device 124 includes any suitable processing or computing device, such as a microprocessor, microcontroller, digital signal processor, field programmable gate array, application specific integrated circuit, or discrete logic devices. Each memory 126 includes any suitable storage and retrieval device, such as a random access memory (RAM) or Flash or other read-only memory (ROM). Each interface 128 includes any suitable structure facilitating communication over a connection or network, such as a wired interface (like an Ethernet interface) or a wireless interface (like a radio frequency transceiver).

The caliper measurements can then be used in any suitable manner, such as to optimize or control the creped tissue paper manufacturing process. For example, in some embodiments, the scanner 118 can provide caliper measurements to a controller 130, which can adjust the manufacturing or other process(es) based on the caliper measurements. For example, the controller 130 could adjust the operation of the creping doctor 112 (such as the angle of the creping doctor blade) or the headbox 102 based on the caliper measurements. The controller 130 includes any suitable structure for controlling at least part of a process.

In particular embodiments, the functionality for measuring the caliper of creped tissue paper can be incorporated into a FOTOSURF surface topography sensor available from HONEYWELL INTERNATIONAL INC. For example, software or firmware instructions for performing the techniques described in this patent document could be loaded onto at least one memory device in the FOTOSURF sensor and executed. The modified FOTOSURF sensor could then be used with the appropriate orientation and possibly backing to measure the caliper of creped tissue paper.

As described in more detail below, the sensor(s) used to measure the caliper of creped tissue paper in the scanner 118 are able to capture non-contact optical caliper measurements. The use of a non-contact sensor can be advantageous since it avoids damaging or otherwise altering the creped tissue paper through contact with a sensor. Moreover, the sensor described in this patent document allows online measurements of the caliper of creped tissue paper. Because of this, it is possible to use the caliper measurements immediately, such as to alter a manufacturing process, and avoid the lengthy delays typically associated with laboratory measurements.

Although FIG. 1 illustrates one example of a system 100 that uses a sensor for measuring the caliper of creped tissue paper, various changes may be made to FIG. 1. For example, the functional division shown in FIG. 1 is for illustration only. Various components in FIG. 1 could be combined, further subdivided, or omitted and additional components could be added according to particular needs. Also, FIG. 1 illustrates a simplified example of one type of system that can be used to manufacture creped tissue paper. Various details are omitted in this simplified example since they are not necessary for an understanding of this disclosure. In addition, the system 100 shown in FIG. 1 uses caliper measurements in an online manner in industrial settings. The same or similar technique could be used in other settings, such as in laboratory instruments.

Figure 2A:
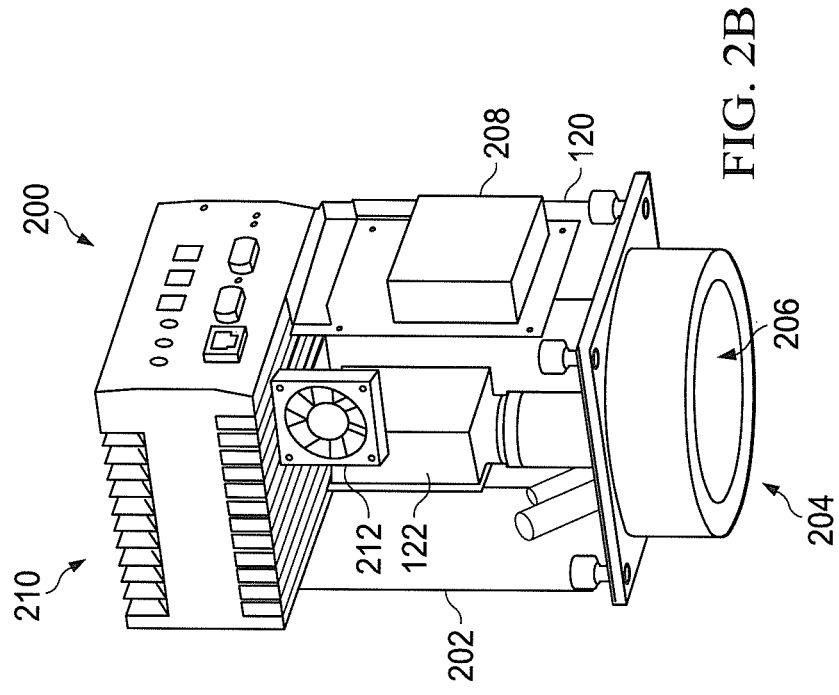
FIGS. 2A through 2C illustrate an example sensor for measuring the caliper of creped tissue paper according to this disclosure.
Figure 2B:
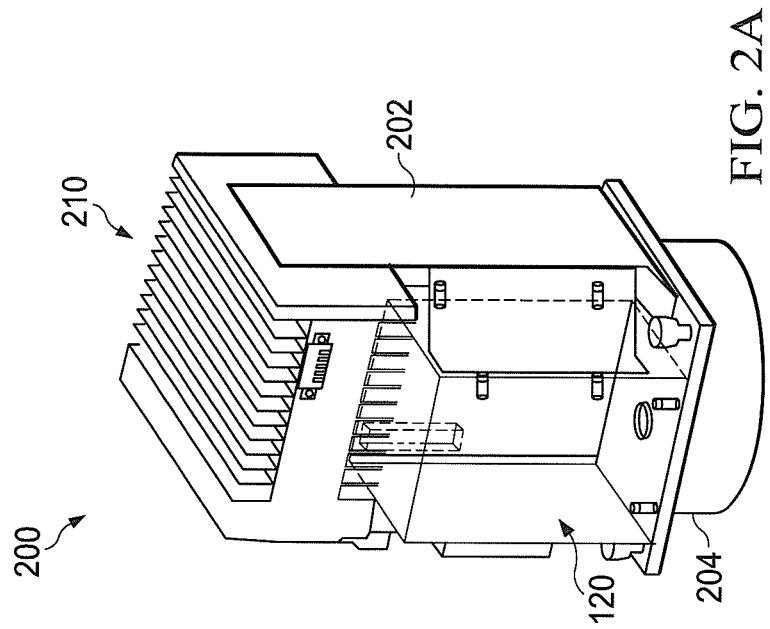
Figure 2C:
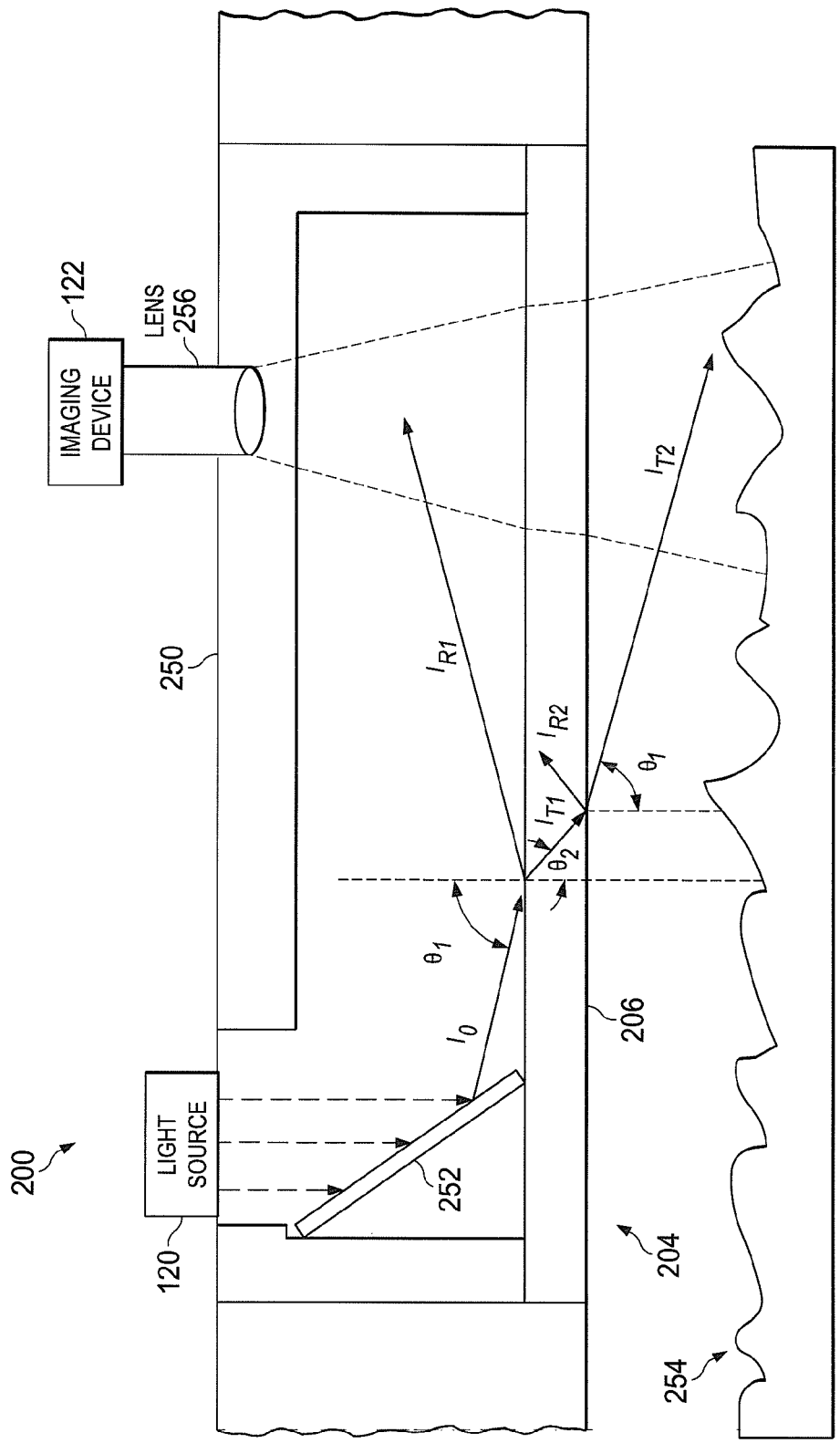

FIGS. 2A through 2C illustrate an example sensor 200 for measuring the caliper of creped tissue paper according to this disclosure. The sensor 200 could, for example, be used in the scanner 118 of FIG. 1. Note that the scanner 118 in FIG. 1 could include a single sensor 200 or multiple instances of the sensor 200. Also note that the sensor 200 need not be used in a scanner and could be used in other ways, such as at a fixed position.

As shown in FIGS. 2A and 2B, the sensor 200 includes the illumination source 120 and the imaging device 122. A housing 202 encases, surrounds, or otherwise protects or supports these and other components of the sensor 200. The housing 202 could have any suitable size, shape, and dimensions. The housing 202 could also be formed from any suitable material(s), such as metal or ruggedized plastic, and in any suitable manner.

A window assembly 204 having a window 206 is positioned at one end of the housing 202. The window assembly 204 represents the portion of the sensor 200 that is directed toward a web of creped tissue paper for measurement of the tissue paper's caliper. The window 206 can help to protect other components of the sensor 200 from damage or fouling. The window 206 can also be optically transparent to illumination used to measure the caliper. For example, the creped tissue paper could be illuminated by the illumination source 120 through the window 206, and an image of the creped tissue paper can be captured by the imaging device 122 through the window 206. In some embodiments, the window 206 can be mounted flush within the window assembly 204 so that little or no dirt or other materials can accumulate on the window 206. The window assembly 204 includes any suitable structure for positioning near a web of material being measured. The window 206 could be formed from any suitable material(s), such as glass, and in any suitable manner.

A power and signal distribution board 208 facilitates the distribution of power and signaling between other components of the sensor 200. For example, the board 208 can help to distribute power to and signals between the illumination source 120, the imaging device 122, and a control unit 210 of the sensor 200. The board 208 includes any suitable structure for distributing power and signaling.

The control unit 210 represents the processing portion of the sensor 200. For example, the control unit 210 could include the processing device 124, memory 126, and interface 128 described above. Among other things, the control unit 210 could control the illumination of a creped tissue paper and analyze images of the tissue paper to identify the caliper of the tissue paper.

Thermal management is provided in the sensor 200 using, among other components, a fan 212. However, any other or additional component(s) could be used to provide thermal management in the sensor 200.

As shown in FIG. 2C, the sensor 200 includes the illumination source 120 and the imaging device 122 described above. The illumination source 120 generates illumination that is provided into an enclosure 250, where a mirror 252 redirects the illumination towards the window 206. For example, the illumination source 120 could emit a pulse of light that is reflected by the mirror 252. The mirror 252 includes any suitable structure for redirecting illumination.

The window 206 refracts part of the illumination towards a web 254 of creped tissue paper. The window 206 can therefore act as an optical element to translate a beam of illumination. The thickness of the window 206 can be selected to deflect the illumination to a desired position. The use of the mirror 252 in conjunction with the window 206 allows the sensor 200 to illuminate the web 254 at a low incidence angle in a relatively small space.

In some embodiments, the web 254 is illuminated at an oblique angle using collimated light. The oblique angle is more than 0° and less than 90° from the normal of the web's surface. In particular embodiments, the oblique angle (as measured normal to the web 254) can be between 60° and 85° inclusive.

At least some of the illumination is reflected from the web 254 and directed back through the window 206 to a lens 256. The lens 256 focuses the light onto the imaging device 122, allowing the imaging device 122 to capture a focused image of the creped tissue paper. The lens 256 includes any suitable structure for focusing light. In some embodiments, the imaging device 122 captures digital images of the web 254 at substantially 90° to the web 254, which could be done in order to maximize the contrast of the captured images.

In some embodiments, reflections from the window 206 and the enclosure 250 could be reduced or minimized using various techniques. For example, the illumination source 120 could emit p-polarized light, and a black matte finish could be used within the enclosure 250. P-polarized light could be generated in any suitable manner, such as by filtering unpolarized light or by using an inherently polarized light source (such as a laser) as the illumination source 120.

The control unit 210 analyzes capture images of the creped tissue paper in order to identify the caliper of the creped tissue paper. One example of the type of analysis that could be performed by the control unit 210 to identify the caliper of the creped tissue paper is provided below.

In some embodiments, compensation for passline and tilt variations can be supported in the sensor 200. Passline variations occur when the web 254 moves away from a desired location with respect to the sensor 200. Tilt variations occur when the web 254 tilts in one or more directions with respect to a desired orientation of the web 254. The control unit, 210 can compensate for these types of variations, such as by modifying digital images prior to analysis. The control unit 210 could also perform any other or additional optical, geometrical, or statistical corrections, such as to compensate for optical aberrations, vignetting, depth of focus, and temperature-dependent noise. Further, the control unit 210 could alter values calculated using the images (such as calipers or values used to identify the calipers) to correct the problems noted above.

Various techniques are known in the art for identifying the tilt and the distance of an imaging device from an object. In one example technique, a known pattern of illumination (such as three spots) can be projected onto the web 254, and the imaging device 122 can capture an image of the web 254 and the projected pattern. The pattern that is captured in the image varies based on the tilt of the web 254 or imaging device 122 and the distance of the web 254 from the imaging device 122. As a result, the captured image of the pattern can be used by the control unit 210 to identify the tilt angles of the web 254 in two directions with respect to the imaging device 122, as well as the distance of the web 254 from the imaging device 122. Note, however, that there are various other techniques for identifying tilt and distance of an object with respect to an imaging device, and this disclosure is not limited to any particular technique for identifying these values.

Although FIGS. 2A through 2C illustrate one example of a sensor 200 for measuring the caliper of creped tissue paper, various changes may be made to FIGS. 2A through 2C. For example, the functional division shown in FIGS. 2A through 2C is for illustration only. Various components in FIGS. 2A through 2C could be combined, further subdivided, or omitted and additional components could be added according to particular needs. Also, the size, shapes, and dimensions of each component could be varied. In addition, note that the control unit 210 need not perform any analysis functions to identify caliper and could simply transmit images (with or without pre-processing) to an external device or system for analysis.

Figure 3A:
FIGS. 3A and 3B illustrate examples of creped tissue papers with different thicknesses according to this disclosure.
Figure 3B:

FIGS. 3A and 3B illustrate examples of creped tissue papers 300, 350 with different thicknesses according to this disclosure. As shown in FIG. 3A, the creped tissue paper 300 generally has a smaller number of crepe folds (undulations) in a given area, and the crepe folds that are present include a number of crepe folds having larger amplitudes. In contrast, as shown in FIG. 3B, the creped tissue paper 350 generally has a larger number of crepe folds in a given area, and the crepe folds that are present include more crepe folds having smaller amplitudes. The amplitudes refer to the distances from the tops of the crepe folds to the bottoms of the crepe folds.

It can be seen here that the total caliper of a creped tissue paper comes predominantly from the amplitudes of the crepe folds in the tissue paper. Larger crepe folds result in larger thicknesses, while smaller crepe folds result in smaller thicknesses. The thickness of any un-creped tissue paper is typically a much smaller component of the total caliper of the creped tissue paper.

Moreover, it can be seen here that the amplitudes of the crepe folds depend (at least in part) on the number of crepe folds in a given area. When there are more crepe folds in a given area of a creped tissue paper, the crepe folds tend to be smaller, and the creped tissue paper has a smaller caliper. When there are fewer crepe folds in a given area of a creped tissue paper, the crepe folds tend to be larger, and the creped tissue paper has a larger caliper.

Based on this understanding, the following presents one example of the type of analysis that could be performed by the control unit 210 to identify the caliper of the creped tissue paper. In some embodiments, the total caliper C of a creped tissue paper can be expressed as:

$$C = C_0 + C_{CS} \quad (1)$$

where $C_0$ denotes the base caliper typical for a given grade of tissue paper, and $C_{CS}$ denotes a crepe structure-dependent component of the total caliper C.

The base caliper $C_0$ is a function of various parameters associated with the production of creped tissue paper. For example, the base caliper $C_0$ can be determined as a function of the crepe percentage being used, the basis weight of the tissue paper being creped, and one or more characteristics of the stock provided to the headbox 102 (such as the stock's fiber content). The crepe percentage is a grade-dependent parameter that, in some embodiments, can be expressed as:

$$((RS_{YD} - RS_{R/D})/RS_{YD}) * 100 \quad (2)$$

where $RS_{YD}$ denotes the rotational speed of the Yankee dryer 110, and $RS_{R/D}$ denotes the rotational speed of the reel or drum 114. Different base caliper values $C_0$ can be determined experimentally for various tissue grades and combinations of parameters, and the appropriate base caliper value $C_0$ can be selected during a particular run of tissue paper.

The crepe structure-dependent component $C_{CS}$ is a function of various parameters associated with the creped tissue paper. For example, the component $C_{CS}$ can be determined as a function of the dominant frequency of the creped tissue paper (denoted $\omega$) and the standard deviation of the intensity of diffusely-reflected light from the creped tissue paper (denoted $\sigma_r$). Both the $\omega$ and $\sigma_r$ values are based an the structure of the creped tissue paper, so the component $C_{CS}$ is dependent on visual changes in the creped tissue paper's structure.

The total caliper of a creped tissue paper could therefore be calculated by selecting the $C_0$ and $C_{CS}$ components for the tissue grade being manufactured and identifying the $\omega$ and $\sigma_r$ values. The control unit 210 can identify the $\omega$ and $\sigma_r$ values using one or more images captured by the imaging device 122, and the control unit 210 can use the $\omega$ and $\sigma_r$ values to calculate the caliper of the creped tissue paper.

Figure 4:
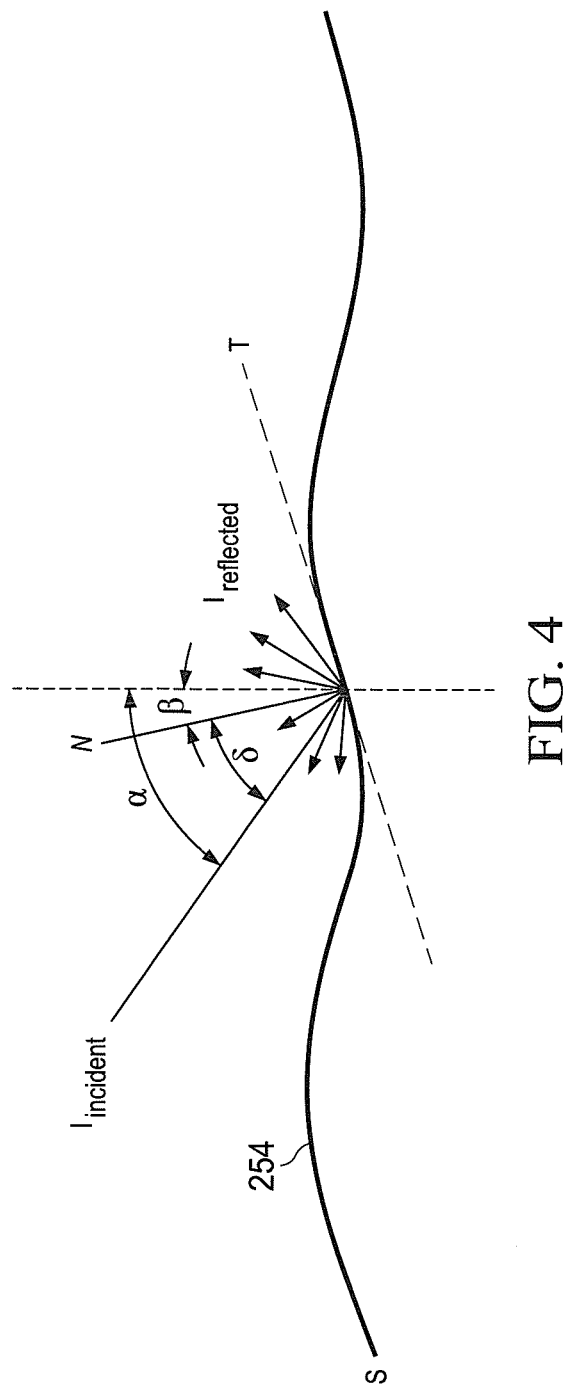
FIG. 4 illustrates an example illumination of creped tissue paper according to this disclosure.

When identifying the $\omega$ and $\sigma_r$ values, an assumption can be made that the web 254 is optically Lambertian, meaning the surface of the web 254 is diffusively reflective. FIG. 4 illustrates an example illumination of creped tissue paper according to this disclosure. More specifically, FIG. 4 illustrates an example illumination of the web 254 under the assumption that the web 254 is optically Lambertian. Here, the intensity of the reflected illumination is substantially isotropic, or independent of the reflection direction.

Based on this assumption, to determine the dominant frequency $\omega$ of a creped tissue paper, the control unit 210 can determine the dominant crepe fold size within a given area of the web 254. The control unit 210 can then count how many folds with such dominant fold size fit within some unit length (such as within a one-inch wide area of the web 254). The counted number of crepe folds per unit length represents the dominant frequency $\omega$.

Figure 5B:
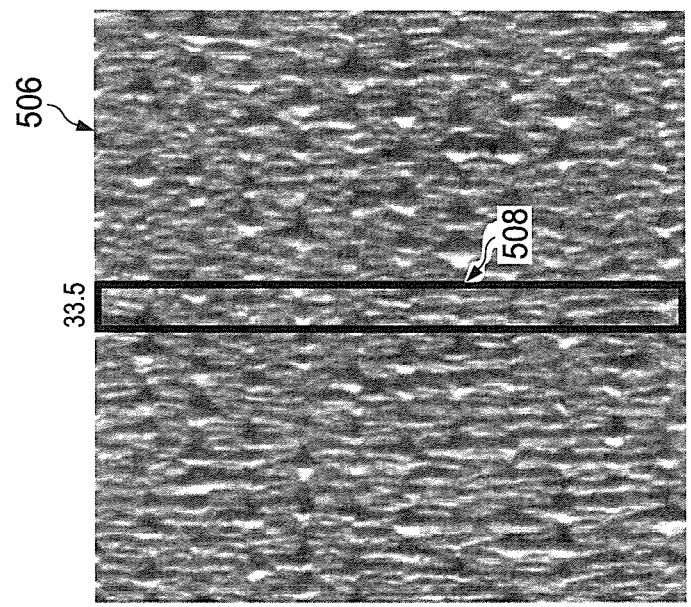
FIGS. 5A and 5B illustrate examples of counting crepe folds per unit length in different creped tissue papers according to this disclosure.
Figure 5A:
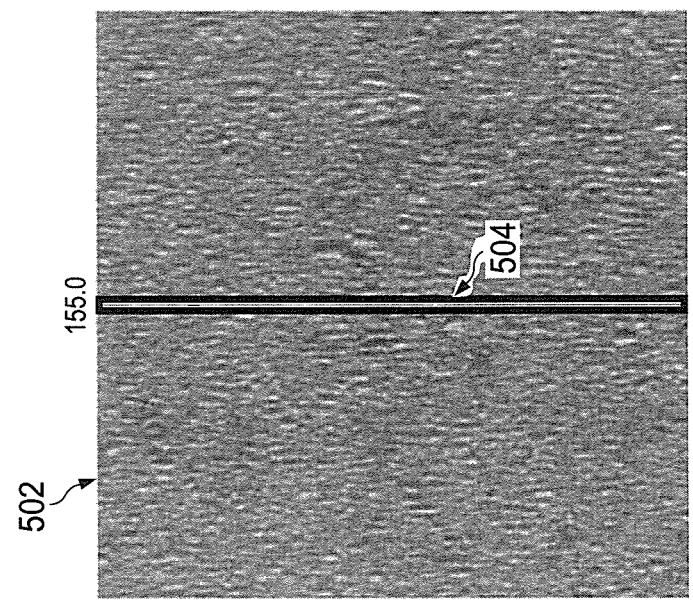

FIGS. 5A and 5B illustrate examples of counting crepe folds per unit length in different creped tissue papers according to this disclosure. In FIG. 5A, a creped tissue paper 502 is shown having very small crepe folds, and a line 504 identifies a unit length (such as one inch) across the creped tissue paper 502. Since the crepe folds are smaller, the number of crepe folds per unit length is quite high (155 folds per inch in this case). In FIG. 5B, a creped tissue paper 506 is shown having much larger crepe folds, and a line 508 identifies a unit length (such as one inch) across the creped tissue paper 506. Since the crepe folds are larger, the number of crepe folds per unit length is much lower (33.5 folds per inch in this case).

Here, the "dominant" crepe fold size could represent the most common fold size within a given area of a creped tissue paper. With a smaller dominant crepe fold size, the crepe folds are generally smaller and more numerous. With a larger dominant crepe fold size, the crepe folds are generally larger and less numerous. One example technique for determining the dominant crepe fold size within a given area of a web is described below with respect to FIGS. 8 through 9B. Additional details of this example approach can be found in U.S. patent application Ser. No. 14/173,284 filed on Feb. 5, 2014, which is hereby incorporated by reference in its entirety into this disclosure.

With respect to the standard deviation $\sigma_r$ of the intensity of diffusely-reflected light from a creped tissue paper, under the Lambertian assumption, light reflected from a perfectly sinusoidal surface is evenly diffused. Any variations in the sinusoidal surface would alter the diffusion of light. Thus, variations in the surface of the web 254 can be used to identify the standard deviation $\sigma_r$ of the intensity of diffusely-reflected light from the web 254.

To determine the expected standard deviation $\sigma_r$, the control unit 210 can determine the variance of reflected light (graylevel) related to the dominant fold size of the tissue paper. This can be expressed as the "macro crepe" of a creped tissue paper.

In some embodiments, the macro crepe can be calculated by integrating a one-sided power spectral density P(v) of a graylevel signal over a band between frequencies $v_1$ and $v_2$ that cover the dominant fold frequency $\omega$. This can be expressed as follows:

$$\text{Macro Crepe} = \sigma_r^2(v_1, v_2) = \int_{v_1}^{v_2} P(v)dv \quad (3)$$

For $v_1$ and $v_2$, it holds that a $\omega \in [v_1, v_2]$. Frequencies $v_1$ and $v_2$ can be constants that satisfy this condition, or $v_1$ and $v_2$ could be dynamically dependent on the dominant fold frequency $\omega$. The standard deviation $\sigma_r$ of diffusely-reflected light from the web can then be calculated as:

$$\sigma_r = \sqrt{\sigma_r^2(v_1, v_2)} = \sqrt{\text{MacroCrepe}} \quad (4)$$

For computational efficiency, the power spectral density P(v) can be extracted as a side product from an FFT-based autocovariance computation (described below with respect to FIG. 8). An average of power spectral density of lines can be computed to obtain the average power spectral density of an image efficiently. This method can be applied for any discrete data with any dimension or direction.

Figure 6C:
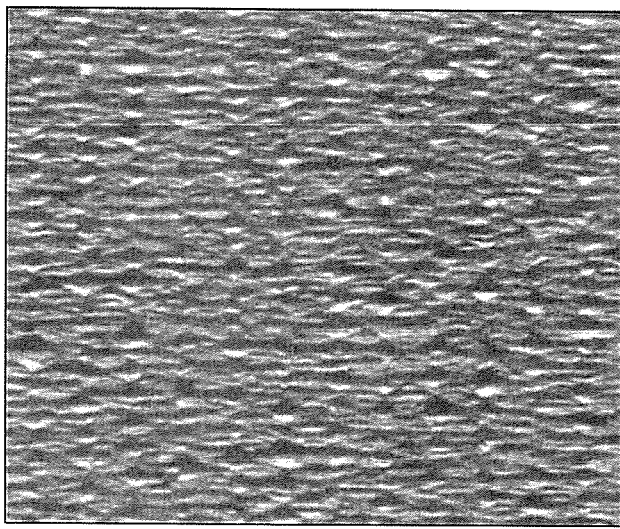
FIGS. 6A through 6C illustrate examples of measuring macro crepe variations for different creped tissue papers according to this disclosure.
Figure 6B:
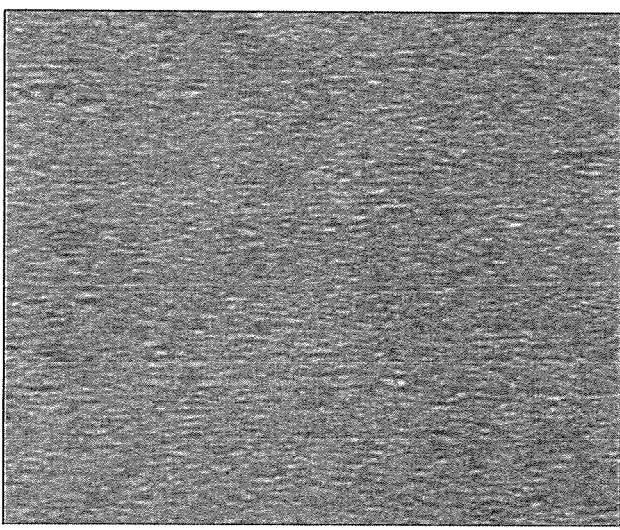
Figure 6A:
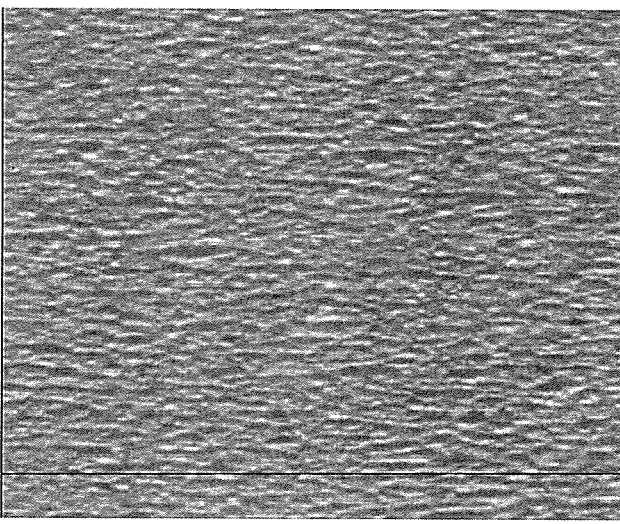

FIGS. 6A through 6C illustrate examples of measuring macro crepe variations for different creped tissue papers according to this disclosure. In each of FIGS. 6A through 6C, a creped tissue paper's texture is shown, along with macro crepe and fold count values (among other values).

Referring again to FIG. 4, the intensity $I_{reflected}$ of light reflected from the web 254 could be expressed as:

$$I_{reflected} = c\vec{I}_{incident} \cdot \hat{N} = c|\vec{I}_{incident}|\cos \delta \propto I_{incident} \cos \delta \quad (5)$$

When the web 254 is viewed from above (such as when capturing an image with the imaging device 122), the intensity of the reflected light varies over the web. This means graylevels vary in the image, which is caused by variations of the angle δ arising from height differences of the web 254. Based on Equation (5) and the discussion above, it can be shown that, for an ideal Lambertian surface or an ideal creped web whose height varies sinusoidally in the illumination direction, the standard deviation $\sigma_r$ of reflected light intensity over the surface of the web is linearly dependent on both the amplitude A and the frequency f of the height variation. This can be expressed as:

$$\sigma_r \propto Af \tag{6}$$

This can be generalized to cases where a creped web is not perfectly sinusoidal. It is evident that a creped structure-dependent component $C_{CS}$ of the tissue caliper (fold height) is equivalent to the amplitude A of the height variation multiplied by two and that the frequency f is equivalent to the dominant frequency ω. Taking account these, Equation (1) can be rewritten as:

$$C = C_0 + C_{CS} = C_0 + k \frac{\sqrt{\text{Macro Crepe}}}{\text{Folds per unit length}} \tag{7}$$

where k is a grade-dependent constant.

The control unit 210 could therefore analyze an image of a creped tissue paper to identify the dominant folds per unit length (a measure of ω) and the macro crepe value (a measure of $\sigma_r$). By identifying the appropriate $C_0$ and k values (which could be selected based on the tissue paper's grade and other parameters), the control unit 210 can calculate the caliper of the creped tissue paper.

Although FIGS. 3A through 6C illustrate various aspects of creped tissue papers, various changes may be made to FIGS. 3A through 6C. For example, these figures are merely meant to illustrate different examples of creped tissue papers and characteristics of those tissue papers. These figures do not limit the scope of this disclosure to any particular type of creped tissue paper.

Figure 7:
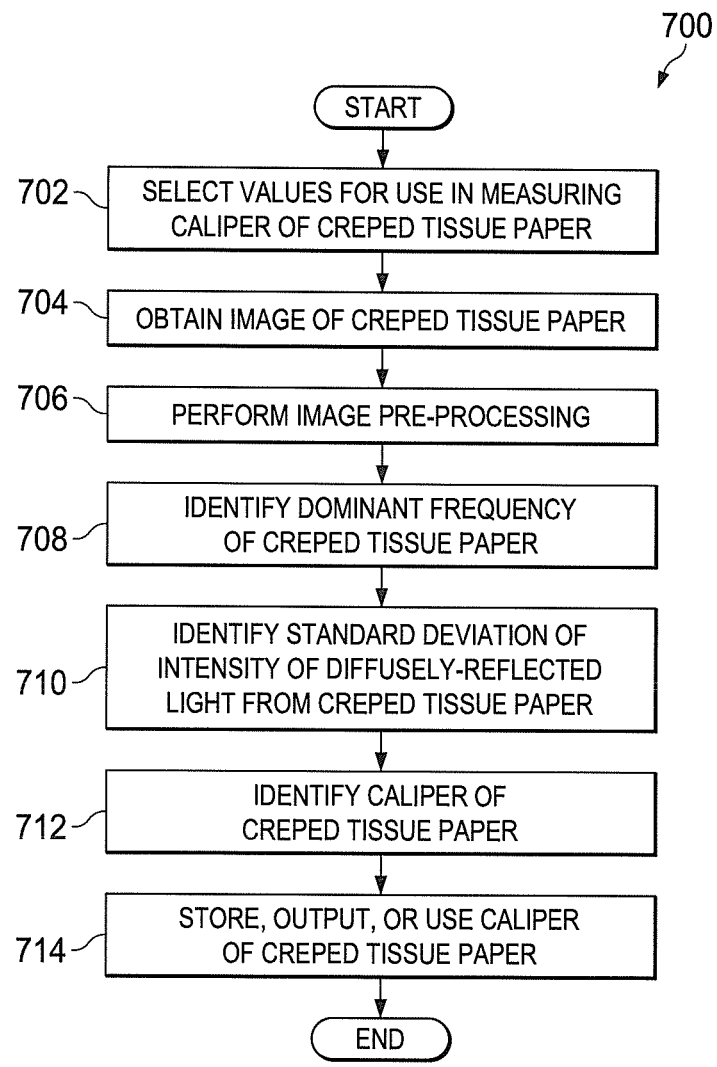
FIG. 7 illustrates an example method for measuring the caliper of creped tissue paper according to this disclosure.

FIG. 7 illustrates an example method 700 for measuring the caliper of creped tissue paper according to this disclosure. As shown in FIG. 7, values for use in measuring the caliper of a creped tissue paper are selected at step 702. This could include, for example, the processing device 124 selecting appropriate $C_0$ and $C_{CS}$ parameters for Equation (1) based on the grade of the tissue paper, the crepe percentage, the basis weight of the tissue paper, and one or more characteristics of the stock provided to the headbox 102. As a particular example, this could include the processing device 124 selecting the appropriate $C_0$ and k parameters for Equation (7).

At least one image of the creped tissue paper is obtained at step 704. This could include, for example, the processing device 124 obtaining an image of the web 254 from the imaging device 122. The image can be captured using any suitable illumination from the illumination source 120, such as illumination at an oblique angle (like at substantially 60° to substantially 85° measured normal to the web 254). The image can be captured at any suitable angle, such as substantially normal to the web 254.

Image pre-processing occurs at step 706. This could include, for example, the processing device 124 digitally correcting the image for any unevenness in the illumination of the web 254. This could also include the processing device 124 digitally correcting the image for any tilting of the imaging device 122 or the web 254. Any other or additional optical, geometrical, or statistical corrections could be performed.

The dominant frequency ω of the creped tissue paper is identified at step 708. This could include, for example, the processing device 124 identifying the dominant crepe fold size of the web 254 using the image. This could also include the processing device 124 identifying how many such folds fit within some unit length (such as within one inch). The technique described below can be used to identify the dominant crepe fold size of the web 254.

The standard deviation $\sigma_r$ of the intensity of diffusely-reflected light from the creped tissue paper is identified at step 710. This could include, for example, the processing device 124 identifying the variance of reflected light from larger structures in the crepe texture.

The caliper of the creped tissue paper is identified at step 712. This could include, for example, the processing device 124 using Equation (1) described above to identify the caliper of the web 254. In particular embodiments, this could include the processing device 124 using Equation (7) described above to identify the caliper of the web 254.

The caliper can be stored, output, or used in any suitable manner at step 714. This could include, for example, the processing device 124 storing the caliper in the memory 126 or outputting the caliper via the interface 128. This could also include the controller 130 altering a manufacturing or processing system based on the caliper.

Although FIG. 7 illustrates one example of a method 700 for measuring the caliper of creped tissue paper, various changes may be made to FIG. 7. For example, while shown as a series of steps, various steps in FIG. 7 could overlap, occur in parallel, occur in a different order, or occur multiple times. As a particular example, it is possible to have both pre-processing of the image and post-calculation adjustment to the caliper or other value(s). For instance, adjustments can be made to the dominant fold size or macro crepe calculations based on optical, geometrical, or statistical corrections.

Figure 8:
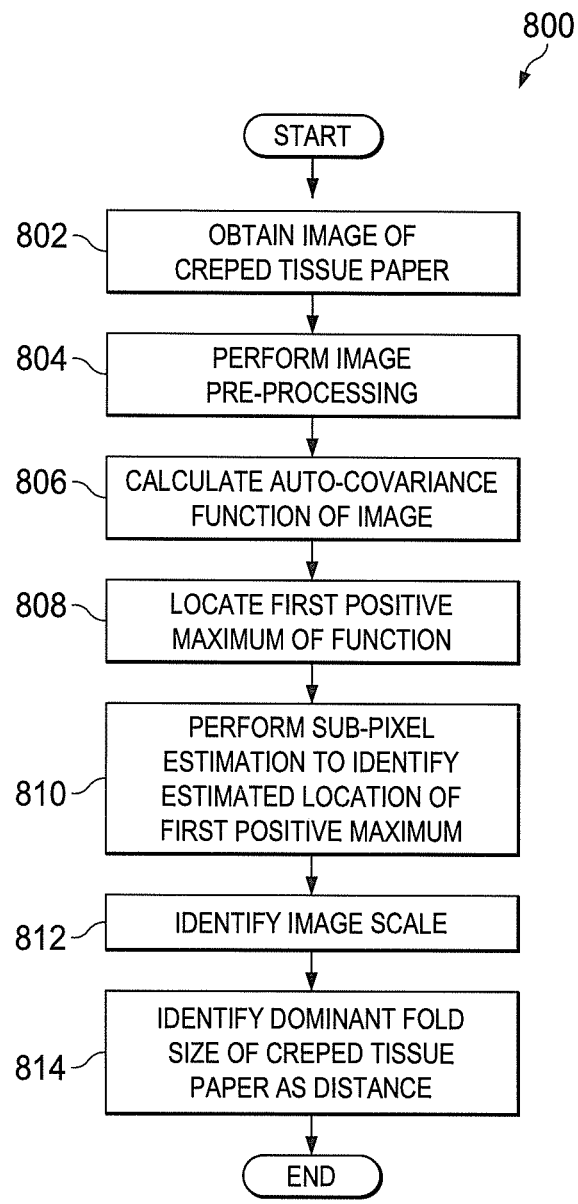
FIG. 8 illustrates an example method for identifying the dominant fold size of creped tissue paper according to this disclosure.

FIG. 8 illustrates an example method 800 for identifying the dominant fold size of creped tissue paper according to this disclosure. The method 800 could, for example, be used to identify the dominant crepe fold size of the web 254, where the dominant crepe fold size is used to identify the dominant frequency ω of the web 254. Note, however, that other approaches for identifying the dominant frequency and/or the dominant crepe fold size of a creped tissue paper could be used.

As shown in FIG. 8, an image of a creped tissue paper is obtained at step 802. This could include, for example, the processing device 124 obtaining an image of the web 254 from the imaging device 122. The image could represent a one-dimensional or multi-dimensional image. In some embodiments, the image can be captured using any suitable illumination, such as annular illumination, oblique illumination, or any other illumination. The image can also be captured at any suitable angle, such as substantially normal to the web 254. In particular embodiments, the image obtained at step 802 could be the same image obtained at step 704 or a different image.

Image pre-processing occurs at step 804. This could include, for example, the processing device 124 digitally correcting the image for any unevenness in the illumination of the web 254. This could also include the processing device 124 digitally correcting the image for any tilting of the imaging device 122 or the web 254. Any other or additional optical, geometrical, or statistical corrections could be performed, such as to compensate for optical aberrations, vignetting, depth of focus, and temperature-dependent noise. In particular embodiments, the image pre-processing at step 804 could be the same image pre-processing at step 706 or different image pre-processing.

An auto-covariance function of the image is identified at step 806. This could include, for example, the processing device 124 generating a discrete auto-covariance function using the pre-processed image data. A discrete auto-covariance function of an image can be determined in various domains, such as the spatial domain or the frequency domain (like after a fast Fourier transform or other transform). A discrete auto-covariance function can be generated to represent the similarity of or relationship between the gray level of adjacent pixels, pixels that are separated by one pixel, pixels that are separated by two pixels, and so on in a particular direction. The direction could represent a row or column of a Cartesian coordinate system or a radial direction of a polar coordinate system. The resulting functions can then be averaged, such as for all rows/columns or in all radial directions, to create a final discrete auto-covariance function. The final auto-covariance function can be defined using a series of discrete points, such as where the discrete points are defined as values between −1 and +1 (inclusive) for whole numbers of pixels.

Note that the phrase "auto-covariance" can be used interchangeably with "auto-correlation" in many fields. In some embodiments, the auto-covariance function represents an auto-covariance function normalized by mean and variance, which is also called an "auto-correlation coefficient."

In particular embodiments, for one-dimensional discrete data, an auto-covariance function (auto-correlation coefficient) in the spatial domain can be expressed as:

$$R(\tau) = \frac{E[(X_t - \mu)(X_{t+\tau} - \mu)]}{\sigma^2} \quad (8)$$

where E denotes an expected value operator, $X_t$ denotes the data value at index (time) t, τ denotes the distance (time lag) between data points, μ denotes the mean value of the data points, and $\sigma^2$ denotes the variance of the data points. In the above equation, a second-order stationary process is assumed.

In other particular embodiments, for two-dimensional discrete data, the auto-covariance function (auto-correlation coefficient) in the spatial domain for the $j^{th}$ row of a two-dimensional gray level image $g_{i,j}$ as a function of pixel distance k can be expressed as:

$$R_j(k) = \frac{1}{(n-k)\sigma^2} \sum_{i=1}^{n-k} (g_{i,j} - \mu)(g_{i+k,j} - \mu) \quad (9)$$

where k is less than n, μ denotes the mean gray level of the image, and $\sigma^2$ denotes the variance in gray level of the image. The average auto-covariance function for the image rows can then be calculated as:

$$\overline{R(k)} = \frac{1}{m}\sum_{i=1}^{m} R_i(k) \quad (10)$$

Note that the mean auto-covariance function (auto-correlation coefficient) as a function pixel distance is not limited to use with rows of pixel data. Rather, it can be calculated with any dimension or direction in an image.

An auto-covariance function in the frequency domain could be computed using the Wiener-Khinchin theorem in a one-dimensional case as:

$$G(f) = FFT[X_t - \mu] \quad (11)$$

$$S(f) = G(f)G^*(f) \quad (12)$$

$$R(\tau) = IFFT[S(f)] \quad (13)$$

Here, FFT[ ] denotes a Fast Fourier Transform, IFFT denotes an Inverse Fast Fourier Transform, and G* denotes the complex conjugate of G. This technique can also be used in each row, column, or other direction of a two-dimensional image. An average of the auto-covariance functions of multiple lines can be computed to obtain the average auto-covariance function of an image efficiently. This technique can be applied to any discrete data with any dimension or direction.

A position of the first positive local maximum of the auto-covariance function (when moving away from the origin) is identified at step 808. This could include, for example, the processing device 124 identifying a positive number of whole pixels associated with the first positive local maximum of the auto-covariance function. This position can be denoted $x_p$.

Sub-pixel estimation is performed to identify a more accurate position of the first positive local maximum of the auto-covariance function at step 810. This could include, for example, the processing device 124 performing a curve-fitting algorithm using the discrete points at and around the $x_p$ position to identify a fitted polynomial. As a particular example, the processing device 124 could fit a second-order polynomial to the discrete point at the $x_p$ position and the discrete points closest to the $x_p$ position. The maximum value of the fitted polynomial is identified, and the position of that maximum value is used as the sub-pixel estimate of the auto-covariance function. The sub-pixel estimate represents the dominant crepe fold size contained in the obtained image expressed as a number of pixels (both whole and fractional pixels).

If desired, the dominant crepe fold size expressed as a number of pixels could be converted into a measure of distance. To do this, an image scale is identified at step 812. This could include, for example, the processing device 124 determining a real-world distance corresponding to each pixel in the obtained image. The real-world distance can be based on various factors, such as the distance of the imaging device 122 from the web 254, the focal length and zoom of the imaging device 122 when the image was captured, and the chip or sensor type of the imaging device 122. The real-world distance can also be determined using a calibration target of a known size. The dominant crepe fold size in terms of distance is identified at step 814. This could include, for example, the processing device 124 multiplying the sub-pixel estimate identified earlier (which represents the dominant crepe fold size expressed as a number of pixels) and the image scale (which represents the distance each pixel represents). The resulting value expresses the dominant crepe fold size as a measure of length. Note, however, that this is optional, and the dominant crepe fold size expressed as a number of pixels could be used to identify the caliper of the web 254.

Although FIG. 8 illustrates one example of a method 800 for identifying the dominant fold size of creped tissue paper, various changes may be made to FIG. 8. For example, while shown as a series of steps, various steps in FIG. 8 could overlap, occur in parallel, occur in a different order, or occur multiple times. As a particular example, it is possible to have both pre-processing of the image and post-calculation adjustment to the dominant crepe fold size.

Figure 9A:
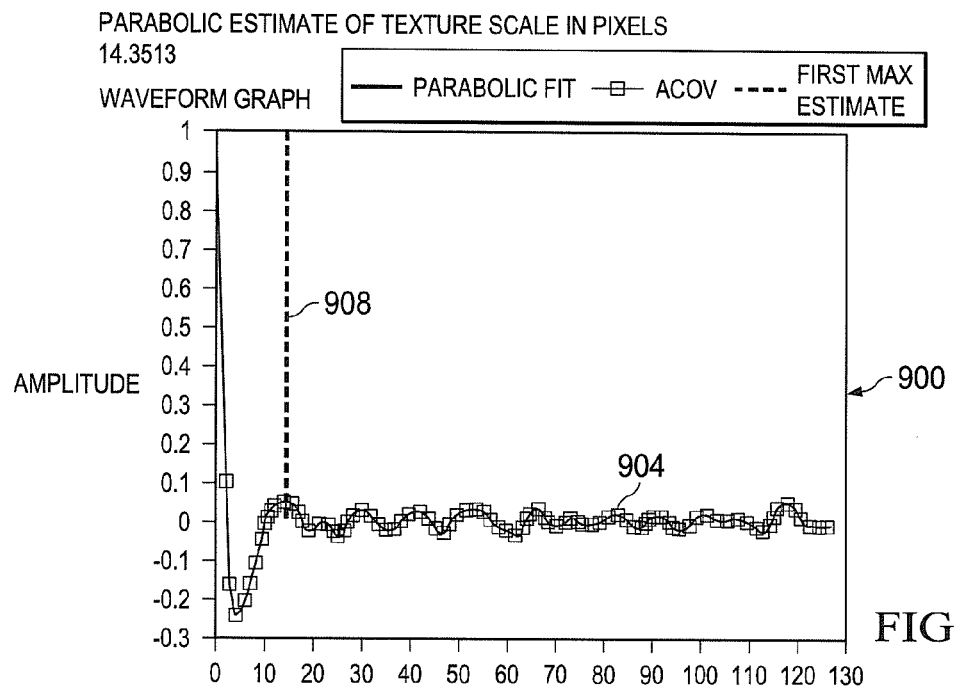
FIGS. 9A and 9B illustrate an example of identifying the dominant fold size of creped tissue paper according to this disclosure.
Figure 9B:
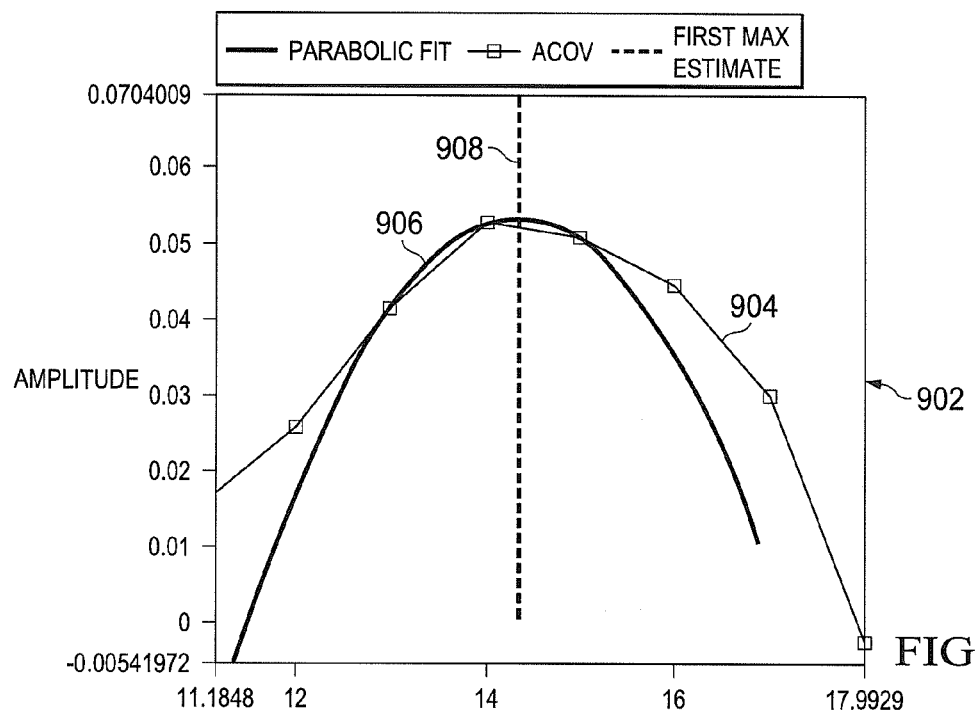

FIGS. 9A and 9B illustrate an example of identifying the dominant fold size of creped tissue paper according to this disclosure. In FIGS. 9A and 9B, two graphs 900-902 could be generated using the image of the creped tissue paper shown in FIG. 5B. In FIG. 9A, the graph 900 includes various discrete points 904, which represent the values of a discrete auto-covariance function. As can be seen here, the first positive local maximum that is encountered when moving away from the origin occurs at a pixel distance of 14. The processing device 124 then fits a polynomial curve 906 against the point 904 at that pixel distance and its neighboring points 904. The maximum value of the polynomial curve 906 is denoted with a line 908, which also represents the dominant crepe fold size expressed in terms of pixels. In this example, the dominant crepe fold size represents 14.3513 pixels. By calculating the distance per pixel, the dominant crepe fold size can optionally be expressed as a length.

Although FIGS. 9A and 9B illustrate one example of identifying the dominant fold size of creped tissue paper, various changes may be made to FIGS. 9A and 9B. For instance, this example is for illustration only and does not limit the system 100 of FIG. 1 or the methods 600, 800 of FIGS. 6 and 8 to any particular implementation.

In some embodiments, various functions described above (such as functions for analyzing digital images and identifying creped tissue paper caliper) are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
using at least one processing device:
obtaining an image of a web of creped tissue paper; and
identifying a caliper measurement of the web using the image, the caliper measurement based on a dominant frequency of the web and a standard deviation of diffusely-reflected light from the web.

2. The method of claim 1, further comprising:
identifying the dominant frequency of the web based on a dominant crepe fold size of the web within the image.

3. The method of claim 2, further comprising:
identifying the dominant crepe fold size of the web based on a discrete auto-covariance function of the image or a second image of the web.

4. The method of claim 3, wherein identifying the dominant crepe fold size of the web comprises:
identifying a first positive local maximum of the discrete auto-covariance function, the discrete auto-covariance function comprising points associated with positive numbers of whole pixels, the first positive local maximum of the discrete auto-covariance function identified at one of the points;
fitting a polynomial curve to the point associated with the first positive local maximum and one or more neighboring points; and
identifying a number of whole and fractional pixels associated with a maximum of the polynomial curve.

5. The method of claim 2, wherein identifying the dominant frequency of the web comprises:
identifying a number of crepe folds having the dominant crepe fold size that fit within a specified unit distance of the web in the image.

6. The method of claim 2, further comprising:
identifying the standard deviation of the diffusely-reflected light from the web based on a variation of reflected light from larger crepe structures in the web.

7. The method of claim 6, wherein identifying the caliper measurement of the web further comprises using a formula of:

$$C = C_0 + k \frac{\sqrt{\text{Macro Crepe}}}{\text{Folds}_{put}}$$

wherein C denotes the caliper measurement of the web;
wherein $C_0$ denotes a base caliper associated with a grade of tissue paper;
wherein k denotes a grade-dependent constant;
wherein Macro Crepe denotes the variance of reflected light related to the dominant crepe fold size of the web; and
wherein $\text{Folds}_{put}$ denotes a number of crepe folds having the dominant crepe fold size that fit within a specified unit distance of the web.

8. The method of claim 7, further comprising:
adjusting at least one of the Macro Crepe and $Folds_{pul}$ values based on at least one of uneven illumination and tilt of the web.

9. The method of claim 1, further comprising:
performing optical, geometrical, or statistical corrections of the image.

10. An apparatus comprising:
at least one memory configured to store an image of a web of creped tissue paper; and
at least one processing device configured to identify a caliper measurement of the web using the image based on a dominant frequency of the web and a standard deviation of diffusely-reflected light from the web.

11. The apparatus of claim 10, wherein the at least one processing device is further configured to identify the dominant frequency of the web based on a dominant crepe fold size of the web within the image.

12. The apparatus of claim 11, wherein the at least one processing device is further configured to identify the dominant crepe fold size of the web based on a discrete auto-covariance function of the image or a second image of the web.

13. The apparatus of claim 12, wherein the at least one processing device is configured to identify the dominant crepe fold size of the web by:
identifying a first positive local maximum of the discrete auto-covariance function, the discrete auto-covariance function comprising points associated with positive numbers of whole pixels, the first positive local maximum of the discrete auto-covariance function identified at one of the points;
fitting a polynomial curve to the point associated with the first positive local maximum and one or more neighboring points; and
identifying a number of whole and fractional pixels associated with a maximum of the polynomial curve.

14. The apparatus of claim 11, wherein the at least one processing device is configured to identify the dominant frequency of the web by identifying a number of crepe folds having the dominant crepe fold size that fit within a specified unit distance of the web in the image.

15. The apparatus of claim 11, wherein the at least one processing device is further configured to identify the standard deviation of the diffusely-reflected light from the web based on a variation of reflected light from larger crepe structures in the web.

16. The apparatus of claim 15, wherein the at least one processing device is configured to identify the caliper measurement of the web further comprises using a formula of:

$$C = C_0 + k \frac{\sqrt{\text{Macro Crepe}}}{Folds_{pul}}$$

wherein C denotes the caliper measurement of the web;
wherein $C_0$ denotes a base caliper associated with a grade of tissue paper;
wherein k denotes a grade-dependent constant;
wherein Macro Crepe denotes the variance of reflected light related to the dominant crepe fold size of the web; and
wherein $Folds_{pul}$ denotes a number of crepe folds having the dominant crepe fold size that fit within a specified unit distance of the web.

17. A non-transitory computer readable medium embodying a computer program, the computer program comprising computer readable program code for:
obtaining an image of a web of creped tissue paper; and
identifying a caliper measurement of the web using the image based on a dominant frequency of the web and a standard deviation of diffusely-reflected light from the web.

18. The computer readable medium of claim 17, wherein the computer readable program code for identifying the caliper measurement comprises computer readable program code for:
identifying a first positive local maximum of a discrete auto-covariance function of the image or a second image of the web, the discrete auto-covariance function comprising points associated with positive numbers of whole pixels, the first positive local maximum of the discrete auto-covariance function identified at one of the points;
fitting a polynomial curve to the point associated with the first positive local maximum and one or more neighboring points;
identifying a number of whole and fractional pixels associated with a maximum of the polynomial curve, the number of whole and fractional pixels representing a dominant crepe fold size of the web; and
identifying a number of crepe folds having the dominant crepe fold size that fit within a specified unit distance of the web in the image;
wherein the dominant frequency of the web is based on the number of crepe folds having the dominant crepe fold size that fit within the specified unit distance of the web.

19. The computer readable medium of claim 18, wherein the computer readable program code for identifying the caliper measurement further comprises computer readable program code for:
identifying the standard deviation of diffusely-reflected light from the web based on a variation of reflected light from larger crepe structures in the web.

20. The computer readable medium of claim 19, wherein the computer readable program code for identifying the caliper measurement further comprises computer readable program code for using a formula of:

$$C = C_0 + k \frac{\sqrt{\text{Macro Crepe}}}{Folds_{pul}}$$

wherein C denotes the caliper measurement of the web;
wherein $C_0$ denotes a base caliper associated with a grade of tissue paper;
wherein k denotes a grade-dependent constant;
wherein Macro Crepe denotes the variance of reflected light related to the dominant crepe fold size of the web; and
wherein $Folds_{pul}$ denotes the number of crepe folds having the dominant crepe fold size that fit within the specified unit distance of the web.

* * * * *